(12) United States Patent
Lee et al.

(10) Patent No.: US 7,558,247 B2
(45) Date of Patent: Jul. 7, 2009

(54) OPTIMIZED RADIO BEARER CONFIGURATION FOR VOICE OVER IP

(75) Inventors: Young Dae Lee, Kyoungki-do (KR); Seung June Yi, Seoul (KR); Sung Duck Chun, Anyang (KR)

(73) Assignee: LG Electronics Inc., Seoul (KR)

( * ) Notice: Subject to any disclaimer, the term of this patent is extended or adjusted under 35 U.S.C. 154(b) by 614 days.

(21) Appl. No.: 11/030,793

(22) Filed: Jan. 6, 2005

(65) Prior Publication Data

US 2005/0201353 A1    Sep. 15, 2005

Related U.S. Application Data

(60) Provisional application No. 60/538,087, filed on Jan. 20, 2004.

(30) Foreign Application Priority Data

Jan. 9, 2004    (KR) ............. 10-2004-0001725

(51) Int. Cl.
*H04L 12/28* (2006.01)
*H04L 12/56* (2006.01)
(52) U.S. Cl. .......... 370/351; 370/389; 370/395.21
(58) Field of Classification Search ........ 370/395.2, 370/395.21, 395.4, 395.42, 395.43, 412, 370/413, 392, 389, 352, 353, 354, 355, 356
See application file for complete search history.

(56) References Cited

U.S. PATENT DOCUMENTS

| | | | |
|---|---|---|---|
| 6,594,699 B1 | 7/2003 | Sahai et al. | |
| 6,650,650 B1 | 11/2003 | Schneider et al. | |
| 7,346,077 B2 * | 3/2008 | Tourunen et al. | 370/469 |
| 2002/0010771 A1 | 1/2002 | Mandato | |
| 2003/0200303 A1 | 10/2003 | Chong | |
| 2004/0066753 A1 * | 4/2004 | Grovenburg | 370/252 |
| 2005/0169205 A1 * | 8/2005 | Grilli et al. | 370/313 |
| 2007/0248075 A1 * | 10/2007 | Liu et al. | 370/349 |

FOREIGN PATENT DOCUMENTS

| | | |
|---|---|---|
| KR | 1020050018050 A | 2/2005 |
| WO | WO 0108372 A2 | 2/2001 |
| WO | WO 0160023 A1 | 8/2001 |
| WO | WO0239673 | 5/2002 |
| WO | WO2005/065060 | 7/2005 |

OTHER PUBLICATIONS

Asma Yasmin, The Route of Data Packets Through the RLC Layer, Nov. 11, 2000, pp. 1-2.*

* cited by examiner

*Primary Examiner*—Chirag G Shah
*Assistant Examiner*—Ashley L Shivers
(74) *Attorney, Agent, or Firm*—Lee, Hong, Degerman, Kang & Waimey (57) ABSTRACT

A radio bearer (RB) configuration to process packets in a single radio bearer. The RB configuration comprising: a first entity to split a received single packet stream into at least two packet sub-streams; and at least two second entities having respectively different modes for a single RB, each second entity to process each packet sub-stream split by the first entity. A method of processing packets in a single RB, comprising: receiving a single packet stream from an upper protocol layer; determining a characteristic of each packet in the received single packet stream; and splitting the determined packets into two different sub-streams, each sub-stream having different delay and/or error rate requirements.

40 Claims, 5 Drawing Sheets

OPTIMIZED RADIO BEARER CONFIGURATION FOR VOICE OVER IP

CROSS REFERENCE TO RELATED APPLICATIONS

The present application claims the benefit of Korean application number 001725, filed Jan. 9, 2004, the disclosure of which is incorporated herein by reference, and claims the benefit of U.S. Provisional Application No. 60/538,087, filed Jan. 20, 2004, the disclosure of which is incorporated herein by reference.

BACKGROUND AND SUMMARY

The present invention generally relates to wireless communications, and in particular, to an optimized radio bearer configuration for voice over Internet protocol (VoIP).

The present invention relates to effectively providing VoIP (Voice over Internet Protocol) in a wireless environment, which is an IP (Internet Protocol) based voice service in a UMTS (Universal Mobile Telecommunications System), which is a European type IMT-2000 system. In particular, the present invention relates to configuring a radio bearer that is optimized for VoIP, by transmitting RTP (Real-time Transport Protocol) packets and RTCP (RTP Control Protocol) packets, which are used in providing VoIP services, via RLC (Radio Link Control) entities that have respectively different modes according to respective packet characteristics, such that the QoS (Quality of Service) for VoIP can be improved.

Voice over Internet Protocol (VoIP) refers to a service for transmitting voice data via an Internet Protocol (IP), to thus provide voice data in a PS (Packet Switched) domain instead of the conventional CS (Circuit Switched) domain. The advantage of VoIP, when compared to CS domain based voice services that transmit data while maintaining an end-to-end connection, is that network resources may be used very effectively because data transmissions occur in a connection-less state (i.e., without having to maintain an end-to-end connection). As communications technologies continue to develop, the amount of user data is also increasing rapidly. Thus, for effectively using network resources, the majority of conventional CS domain based services are now being replaced by PS domain based services. VoIP has been developed in this context, and it is expected that for practically all communications systems in the future, voice communications services will be provided through VoIP.

Although VoIP has the advantage of effectively using network resources, is the disadvantage is that its QoS (Quality of Service) is lower than that of conventional CS domain based voice services. There are many factors that affect the QoS, including delay, jitter (i.e., delay variation), FER (Frame Error Rate), etc. to name a few. When VoIP was first developed, its QoS was drastically lower than that for CS domain based voice services. However, due to much research and development, for wired (wireline) interface VoIP and for CS domain based voice services, the QoS of almost the same level can be guaranteed.

Through the research and development of wired interface VoIP, the RTP (Real-time Transport Protocol) that can effectively provide PS domain based voice services was developed. Also, the RTCP (RTP Control Protocol) that functions to provide feedback for RTP packet transmissions was developed. In RTP, time stamp information is contained within each packet, thus the problems related to jitter can be solved. In RTCP, the FER can be reduced by allowing the RTP source to perform rate control according to the reporting of any losses in RTP packets. In addition to the RTP and RTCP, the SIP (Session Initiation Protocol) and SDP (Session Description Protocol), etc. have also been developed for maintaining an end-to-end virtual connection.

As such, for wired interface VoIP, the QoS can be guaranteed to a level that is currently satisfactory, but for radio (wireless) interface VoIP, the QoS is significantly lower than that of CS domain based voice services. To increase the transmission efficiency for radio interface VoIP, an improved header compression technique, called ROHC (Robust Header Compression) has been developed and used. However, the overall QoS is still significantly lower than that of CS domain based voice services.

The greatest problem in supporting VoIP in the radio interface is that when RTP and RTCP packets (that are provided as a single stream in the wired interface) are also provided as a single stream in the radio interface, the QoS is decreased because their packet characteristics are respectively different. Namely, RTP packets, being real-time user data, are tolerant to errors but are sensitive to delays and jitter. RTCP packets, being control data, are tolerant to delays and jitter but are sensitive to errors. Also, because RTP packets contain voice data, packets having a relatively small size are transmitted frequently and regularly, and because RTCP packets contain control data, packets having a size that is quite large compared to RTP packets are transmitted infrequently and irregularly. If RTP packets and RTCP packets having respectively different characteristics are provided as a single stream in the radio interface, the QoS will decrease drastically in a wireless (radio) environment, which has much more inferior conditions than a wired environment.

Basically, a radio protocol handles the guaranteeing of the QoS in the radio interface for a particular service. The radio protocol differs according to the communications system, and the present disclosure will describe an asynchronous IMT-2000 system, namely, a UMTS (Universal Mobile Telecommunications System) based radio protocol. In UMTS, a RB (Radio Bearer) service is used for providing a particular service in the radio interface. The RB service is a service that the first and second layers (Layers 1 and 2) provide to the upper layers in a radio protocol. Currently, in UMTS, a physical (PHY) layer, a medium access control (MAC) layer, a radio link control (RLC) layer, and a packet data convergence protocol (PDCP) layer are defined. The radio protocol layers directly affect the QoS of the radio interface, and because the radio interface has much more inferior conditions than the wired interface, it can be said that the radio protocol layers affect the overall end-to-end QoS. The radio protocols also play a major role in the transmission of RTP and RTCP packets, thus the transmission of RTP and RTCP packets in the radio interface will be considered in more detail.

Figure 1:
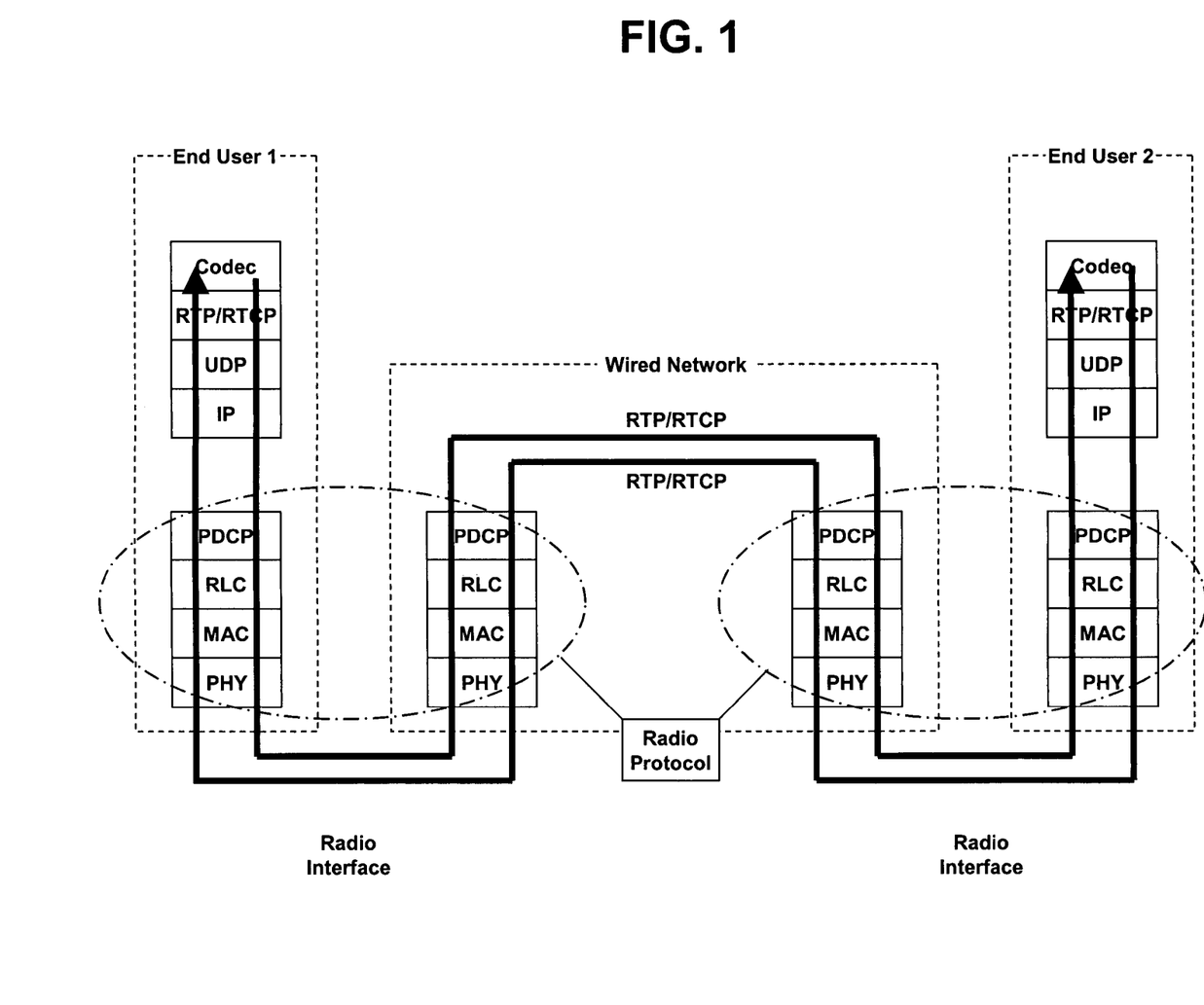
FIG. 1 depicts a packet flow during VoIP communications between two end-users in a UMTS.

FIG. 1 depicts a packet flow during VoIP communications between two end-users in a UMTS. First, the voice data of End User 1 is sent to the RTP/RTCP via a codec protocol layer, and these voice data are included in the RTP packets. Then, the RTP packets pass through the UDP (User Datagram Protocol) and IP layers, and are transferred to the radio protocol in RTP/UDP/IP format. In the radio protocol, the PDCP layer first receives these packets and performs header compression thereon. Thereafter, the header compressed RTP/UDP/IP packets go through the RLC, MAC, and PHY layers, and then is transmitted through the radio interface. The wired network decompresses the compressed RTP/UDP/IP packets via the PHY/MAC/RLC/PDCP layers, which are peer entities to the radio protocol of End User 1.

In the wired interface, packets in RTP/UDP/IP format are transferred to the destination, and for transferring to the End User 2, the packets must go is through the radio protocol once again. The RTCP packets are generated by the end user receiving the RTP packets. In general, to provide feedback regarding the loss of RTP packets, transmissions are performed in a reverse direction from that of RTP packets, but in case of forward control (e.g., informing RTP source information, controlling the RTP receiver, etc.), transmissions can be performed in the same direction as that of RTP packets. Generally, as VoIP pertains to bidirectional communications between two end users, there are usually two RTP/RTCP flows that are transmitted in respectively different directions.

The RTP/RTCP packet transmissions in the radio (wireless) interface are handled by the PDCP/RLC/MAC/PHY layers, as described previously. It should be noted that these radio protocols provide not only RTP/RTCP packet transmissions, but also provide radio interface services for all services provided in UMTS. Radio protocols exist in pairs at each end of the radio interface, namely at a terminal and at a UTRAN (UMTS Terrestrial Radio Access Network), and operate in a peer-to-peer manner. In other words, the radio protocol layers in the terminal and those in the UTRAN have the same architecture (structure), and thus the architecture of only one of these portions (in the terminal or the UTRAN) will be considered for simplification.

Figure 2:
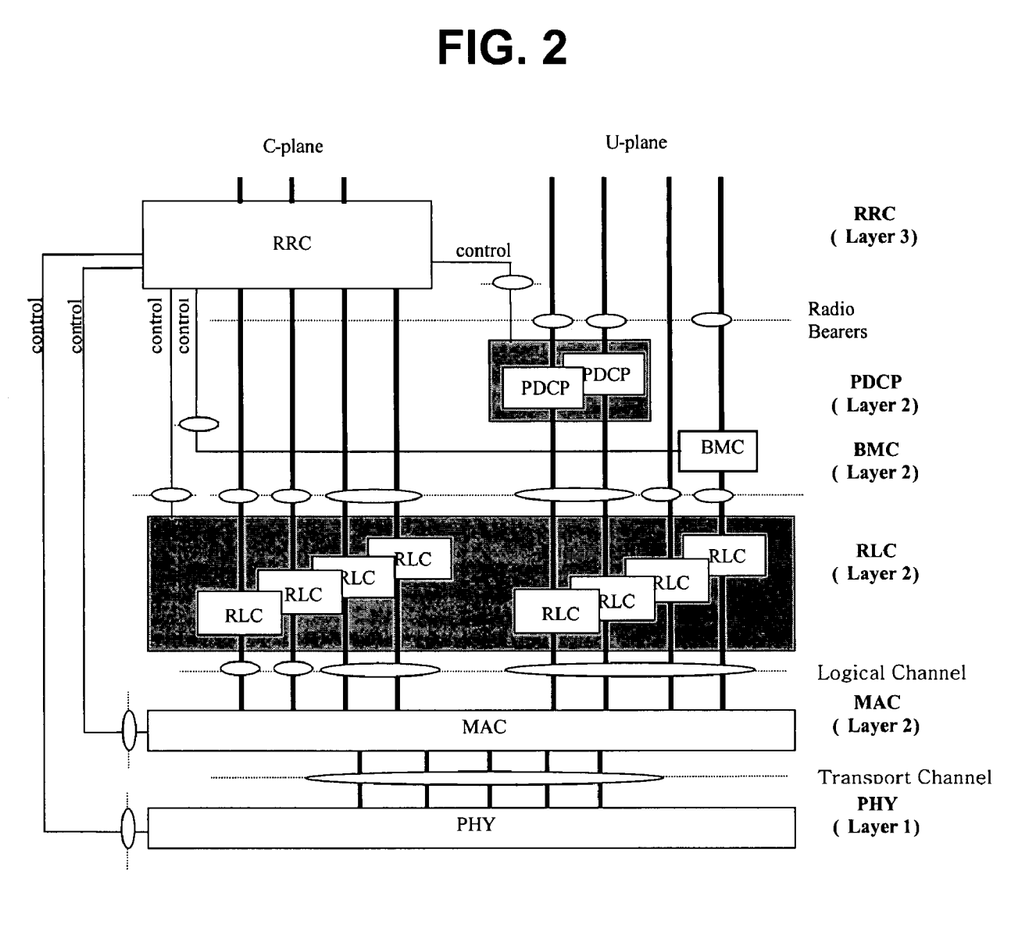
FIG. 2 depicts the architecture (structure) of the radio protocol used in UMTS.

FIG. 2 depicts the architecture (structure) of the radio protocol used in UMTS. Regarding each layer of the radio protocol, Layer 1 (PHY layer) provides information transfer service to an upper layer by using various radio transmission techniques, and is connected with the MAC layer thereabove via a transport channel, through which data is transmitted between the MAC and PHY layers. In Layer 2, the MAC, RLC, PDCP, and BMC layers exist. The MAC layer provides the re-allocation service of MAC parameters for allocation and re-allocation of radio resources, and is connected with the RLC layer (an upper layer) via a logical channel, whereby various logical channels are provided according to the type of data being transmitted. In general, a control channel is used when transmitting control plane data, while a traffic channel is used when transmitting user plane data.

The RLC layer handles the guaranteeing of QoS for each RB (radio bearer) and its data transmissions. As the RB service is a service that Layer 2 of the radio protocol provides to the upper layers, the entire Layer 2 affects the QoS, but the effect of the RLC is especially large. For guaranteeing the QoS that is unique to the RB, the RLC has one or two separate (independent) RLC entities for each RB, and three types of RLC modes (TM: transparent mode, UM: unacknowledged mode, and AM: acknowledged mode) for supporting various QoS. Each of these RLC modes operate differently because each supports different QoS, and their detailed functions are also respectively different. The RLC employs these independent RLC entities and various RLC modes in order to support the QoS that is appropriate for each RB.

The PDCP layer is located above the RLC layer and employs IP packets under IPv4 or IPv6 so that the transmitted data can be effectively transmitted in the radio interface that has a relatively smaller bandwidth. To achieve this, the PDCP layer performs the function of minimizing the amount of any unnecessary control information used in the wired network. This function is called header compression, which allows transmission of only required information in the data header such that transmission efficiency in the radio interface is increased. The PDCP layer, because header compression is a basic function, only exists in the PS domain, and one PDCP entity exists for each RB to provide effective header compression function for each PS service.

Also in Layer 2, a BMC (Broadcast/Multicast Control) layer exists above the RLC layer and handles the scheduling of cell broadcast messages to perform the function of broadcasting to terminals located within a particular cell, but is not involved with the transmission of RTP/RTCP packets.

The RRC (Radio Resource Control) layer, located at the lowermost portion of Layer 3, is only defined in the control plane and handles the control of transport channels and physical channels related to the establishing, re-establishing, and releasing of radio bearers (RBs). Here, as described previously, the RB refers to a service provided by Layer 2 for transferring data between the terminal and the UTRAN. In general, the establishing of the RB refers to the setting of the characteristics of the radio protocol layers and channels for providing a particular service, and also refers to the procedures in setting the individual particular parameters and operation methods.

As described above, there are three operation modes for the RLC layer, each of which operates differently. Each RLC mode should be considered in more detail to determine which RB mode is appropriate for which RB service.

First, the TM RLC mode is a mode in which no overhead is attached to the RLC SDU (Service Data Unit) received from an upper layer when constituting a RLC PDU (Protocol Data Unit). The TM RLC was basically developed for the purpose of processing voice data of the CS domain, whereby the RLC SDU size is fixed, thus the TM RLC uses the SDU itself to constitute the PDU, which is then transmitted. Namely, in TM RLC, the SDU and PDU are mapped in a one-to-one relationship and pass through in a transparent manner, hence the name "TM" (Transparent Mode) RLC.

Unlike the transparent mode, the mode in which an overhead is added at the RLC is called non-transparent mode, which has two types: unacknowledged mode (UM) that does not have transmission data reception confirmation reply, and acknowledged mode (AM) that has such reply.

The UM and AM RLCs were developed for the purpose of handling PS domain data, whereby the RLC SDU size may vary for each packet due to the characteristics of the PS domain data, and thus the SDUs undergo segmentation and concatenation to form PDUs having uniform size. To support the segmentation and concatenation of SDUs, an indicator (or identifier) indicating the boundary of the SDUs included in the PDU and a sequence number (SN) allowing discernment of each PDU is required, thus a PDU header is necessary.

The UM RLC transmits upon forming a PDU by attaching a header that includes information regarding the concatenation and segmentation of SDUs, and this mode is appropriate for real-time PS services, such as VoIP or PS streaming. Like UM RLC, the AM RLC form a PDU by attaching a PDU header, but unlike UM RLC, the receiving side (receiver) sends an acknowledgement for the PDU transmitted by the transmitting side (transmitter). In AM RLC, the reason for replying by the receiving side is to request re-transmission by the transmitting side for those PDUs not received, and this feature of re-transmission is the major characteristic of the AM RLC. Accordingly, the purpose of the AM RLC is to guarantee error-free data transmissions by performing re-transmissions, and thus the AM RLC handles the transmission of non-real-time packet data, such as TCP/IP in the PS domain. Thus, PS services can be broadly classified into those using the UM RLC for services in which delays are important and using the AM RLC for services in which error rates are important.

Considering the communication directions, TM and UM RLCs are used in uni-directional communications, while AM RLC is used in bi-directional communications because feedback from the receiving side exists. As such bi-directional communications are mainly used in point-to-point (p-t-p) communications, the AM RLC only employs a dedicated logical channel. There are also structural differences, whereby TM and UM RLCs have one structure in which a single RLC entity either only transmits or only receives, but for AM RLC, both a transmitting side (transmitter) and a receiving side (receiver) exist in a single RLC entity.

In particular, because the AM RLC must support re-transmission functions, its structure is much more complicated than that of the TM or UM RLCs. For managing re-transmissions, the AM RLC has a re-transmission buffer in addition to a transmitting/receiving buffer. Also, many other functions are performed, such as using a transmitting/receiving window for flow control, performing polling by the transmitting side to request status (state) information from the peer RLC entity of the receiving side, sending a status report by the receiving side to report its buffer state to the peer RLC entity of the transmitting side, using a status PDU for carrying status information, performing a piggyback function to insert the status PDU into the data PDU in order to increase data transmission efficiency, and the like. Also, to support these functions, the AM RLC requires various types of parameters, state variables, and timers.

As VoIP is a PS voice service, the UM RLC is used to transmit and because it is a bi-directional service, two UM RLCs are connected to a single PDCP to allow data having respectively different directions to be transmitted.

Figure 3:
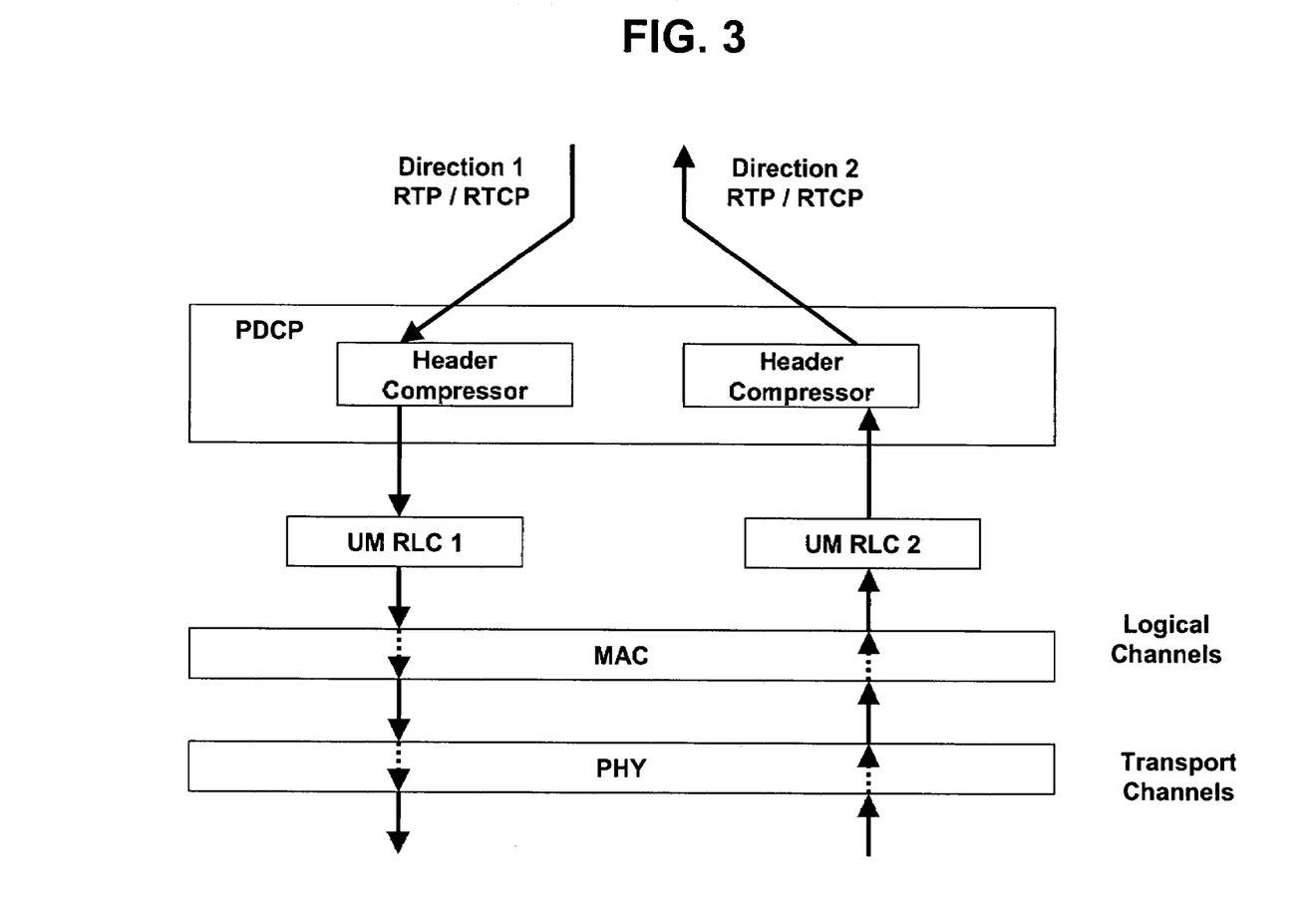
FIG. 3 depicts an RB architecture of UMTS for VoIP data transmissions according to the conventional art.

FIG. 3 depicts an RB architecture (structure) of the UMTS for VoIP data transmissions. To support VoIP, the RB shown in FIG. 3 is formed at both the terminal and the UTRAN. Because VoIP is a bidirectional service, the UTRAN provides two RTP/RTCP flows in respectively different directions. The RB for VoIP consists of one PDCP entity and two UM RLC entities, whereby each UM RLC entity operates in respectively different directions. The MAC and PHY are layers common to all RBs, thus a particular entity is not generated, and merely supports the mapping of logical channels, transport channels, and physical channels. In the PDCP, a compressor and a decompressor are formed for header compression and decompression of RTP/RTCP packets.

When providing VoIP services using the conventional RB architecture, the following problems exist. The RTP and RTCP packets are sent to the radio protocol via a single flow, but because the RTCP packets are much larger in size than RTP packets, the transmission of the RTP packets (that are sent to the radio protocol after the RTCP packets are sent) are delayed while the RTCP packets are being transmitted. Unlike RTCP packets, because RTP packets are sensitive to delays and jitter, if transmission of RTP packets is delayed for a prolonged period of time, and after the lapse of a preset time period, such RTP packets are not transmitted but discarded. Namely, when employing the conventional method for providing VoIP services, undesirable discarding of RTP packets can occur due to the transmission of RTCP packets, which is thus a cause of degradation for QoS of VoIP, and a solution to such problems is required.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The following description is based upon the presently preferred exemplary and non-limiting embodiments of the present invention. More particularly, various inventive concepts and principles embodied in systems and methods therein are discussed and described.

To solve the above-identified problems of the conventional art, the present invention provides a method of transmitting RTP and RTCP packets sent to the radio protocol via a single flow by using respectively different RLC modes according to their characteristics. Namely, the present invention provides a method in which RTP packets requiring real-time characteristics to be maintained, are transmitted through the UM RLC, and RTCP packets requiring error-free transmissions are transmitted through the AM RLC that allows for re-transmissions. Also, the PDCP in the transmitting side includes a function for distinguishing and transferring RTP and RTCP packets received from an upper layer in a single flow, such that the RTP and RTCP packets are sent to RLCs of respectively different modes, while the PDCP in the receiving side includes a function for transferring the RTP and RTCP packets received from respectively different RLCs to an upper layer via a single flow. Here, a distinguishing and transferring device (e.g., a splitter) of the PDCP and a distinguishing and receiving device (e.g., a combiner) of the PDCP are preferably located below the header compressor and header decompressor, respectively. This is because, by providing a single header compressor and header decompressor for both RTP and RTCP packets, the memory (storage) related thereto can be saved (reduced), and the signaling load in setting (establishing) the header compressor and decompressor can be minimized. If a distinguishing and transferring device and a distinguishing and receiving device are each provided above the header compressor and above the header decompressor, this would mean that two header compressors and two header decompressors are to be used, which would then not achieve the above explained advantages.

The present invention transmits RTP and RTCP packets through respectively different RLC modes, but if transmissions are performed through respectively different channels up to the physical channel, the problem of increasing the waste of radio resources is created. Thus, the present invention provides a method by which the RTP and RTCP packets that are divided (separated) into two flows by the RLC are combined together into a single flow once again at the MAC layer or PHY layer and transmission is performed via a single physical channel to increase efficient usage of radio resources. Namely, multiplexing is performed on the logical channel between the RLC and the MAC, or multiplexing is performed on the transport channel between the MAC and the PHY, and then transmission via a single physical channel is performed. Namely, a gist of the present invention is to provide a single radio bearer that uses at least two transport streams with respectively different characteristics.

However, when multiplexing in the MAC or PHY, when the RTP and RTCP flows are unconditionally multiplexed, the undesirable discarding of RTP packets due to RTCP packet transmissions may occur as in the conventional art. Accordingly, the present invention further employs a logical channel priority handling of the MAC employed in the conventional UMTS in order to handle the RTP and RTCP flow. The logical channel priority handling of the MAC refers to a function that first transmits data of a logical channel having high priority when logical channel multiplexing or transport channel multiplexing occurs at the transmitting side. Namely, for example, a logical channel for RTP flow is assigned a high priority and a logical channel for RTCP flow is assigned a low priority, and the RTCP packets are to be transmitted only when there are no RTP packets to be transmitted. This method takes advantage of the fact that human voice signals contain silence periods (i.e., periods of silence in a voice signal) and that bidirectional communications have relatively long silence periods, whereby control data is sent during idle periods of voice data. Here, it should be noted that the order in which the PDCP sends RTP and RTCP packets to the RLC may be different when actually transmitting through the radio interface due to the logical channel priority handling function. Namely, due to the transmission delays of RTCP packets, the order of transmitting and receiving RTP and RTCP packets at both ends of the radio protocol may be changed, but because RTCP packets are control data that are tolerant to errors but relatively sensitive to delays, the affects of transmission delays of RTCP packets can be said to be minimal.

Figure 4:
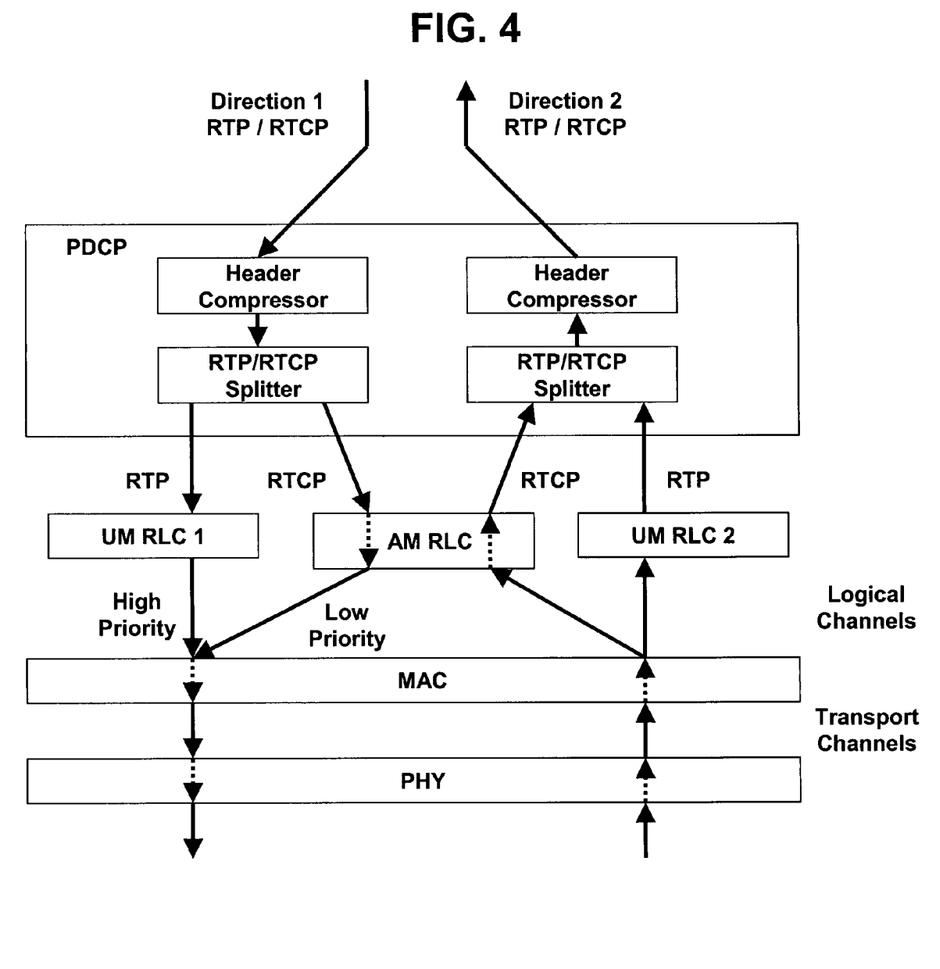
FIG. 4 depicts an RB architecture for VoIP according to an embodiment of the present invention in which logical channel multiplexing is applied.
Figure 5:
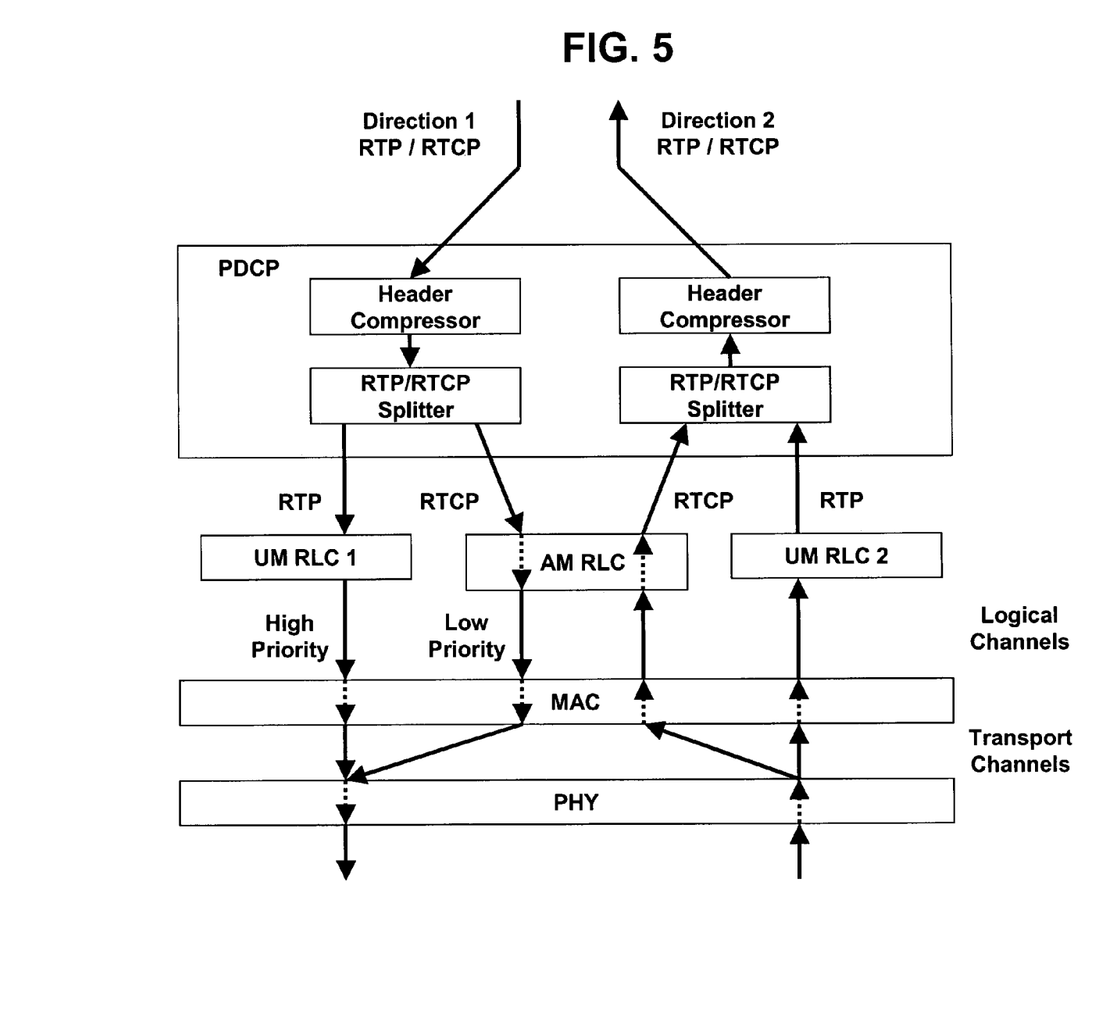
FIG. 5 depicts an RB architecture for VoIP according to an embodiment of the present invention in which transport channel multiplexing is applied.

FIGS. 4 and 5 depict an RB architecture (structure) for VoIP according to an embodiment of the present invention. FIG. 4 depicts the situation where logical channel multiplexing is applied, and FIG. 5 depicts the situation where transport channel multiplexing is applied.

FIGS. 4 and 5 conceptually depict the distinguishing and transmitting device (e.g., splitter) and the distinguishing and receiving device (e.g., combiner) of the PDCP, and these functions may actually be performed at the header compressor and decompressor. Also, the drawings depict RTCP packets in the first direction and the second direction both being handled by a single AM RLC, but the RTCP packets may also be handled by a separate AM RLC provided for each direction, respectively. However, as the AM RLC is basically bidirectional, it is preferably that a single AM RLC handles RTCP packets for both directions. Also, the drawings depict an RB architecture for a bidirectional communications VoIP service, but for a uplink dedicated or downlink dedicated unidirectional communications service, the radio protocol would be formed for only one direction. For example, assuming a downlink dedicated streaming service, the UTRAN would have a transmitting side structure shown in the drawings, while the terminal (UE) would have a receiving side structure shown in the drawings.

The RB architecture and techniques according to the present invention have many differences compared with those of the conventional art, because two UM RLC entities and a single AM RLC entity can be employed in a single RB. Namely, the conventional art data services were simple enough that a single RB need only employ one type of RLC mode, but such conventional RB architecture is not appropriate for handling multimedia data services having various QoS that need to be guaranteed. As such, the present invention was developed such that a single RB comprises respectively different RLC modes.

Also, in contrast to the conventional RB comprising one AM RLC and one or two UM or TM RLCs, the present invention provide an RB with two UM RLCs and one AM RLC for handling bi-directional services such as VoIP, and an RB with one UM RLC and one AM RLC for handling uni-directional services such as uni-directional streaming services. Because a RB identity is included for each RB established for the radio protocol, the UM RLC and the AM RLC must have the same RB identity in order to form the RB according to the present invention. In the conventional art, respectively different RB identities are used for respectively different RLC modes, using the same RB identity for respectively different RLC modes as in the present invention requires modifications in the signaling methods used for establishing the RB.

The present invention provides a method of processing packets in a single radio bearer, comprising: receiving a single packet stream from an upper protocol layer; determining a characteristic of each packet in the received single packet stream; and splitting the determined packets into two different sub-streams, wherein each sub-stream has a different delay requirement and/or an error rate requirement.

Preferably, the splitting is performed according to a quality of service (QoS) requirement, and the characteristic of each packet identifies a packet type. Preferably, one sub-stream is for RTP (real-time transport protocol) packets and the other sub-stream is for RTCP (RTP control protocol) packets. The RTP packets are transmitted through a first RLC entity and the RTCP packets are transmitted through a second RLC entity.

The method can further comprise a step of performing logical channel priority handling, which minimizes any delays in transmitting the RTP packets by transmitting the RTP packets at a higher priority compared with the RTCP packets. Preferably, header compression is performed for the packets in the received single packet stream, prior to the separating step.

The method can further comprise the steps of: receiving packets from two different sub-streams, wherein each sub-stream has a different delay requirement and/or an error rate requirement; combining the received packets into a single packet stream; and sending the single packet stream to an upper protocol layer.

Preferably, header decompression is performed for the packets in the single packet stream to be sent, after the combining step. Also, logical channel multiplexing or transport channel multiplexing is performed. Preferably, the steps of the method are for Voice over Internet Protocol (VoIP) communications, wherein the steps are performed by a terminal or the steps are performed by a network.

The present invention further provides a radio bearer configuration, comprising: a first packet handling entity to split a received single packet stream into at least two packet sub-streams; and at least two second packet handling entities having respectively different modes for a single radio bearer, each second packet handling entity to process each packet sub-stream split by the first packet handling entity.

Preferably, the first packet handling entity splits the single packet stream by checking a format field of a protocol data unit (PDU) such that packets of a first type are forwarded in a first packet sub-stream and packets of a second type are forwarded in a second packet sub-stream. Here, the checking of the format field involves checking a field in a header of the PDU.

Preferably, the first type of packets are RTP (real-time transport protocol) packets and the second type of packets are RTCP packets.

Preferably, each packet handling entity is part of a radio protocol layer, wherein the first packet handling entity is a packet data convergence protocol (PDCP) entity, and the first packet handling entity comprises a header compressor that receives data packets and performs header compression thereon. Also, the first packet handling entity comprises a splitter that splits the single packet stream into one packet sub-stream for RTP (real-time transport protocol) packets and another packet sub-stream for RTCP (RTP control protocol) packets. Here, the splitter can be implemented in software, in hardware, or in a combination of software and hardware.

Also, the first packet handling entity comprises a combiner that combines one packet sub-stream for RTP (real-time transport protocol) packets and another packet sub-stream for RTCP (RTP control protocol) packets into a single packet stream. Here, the combiner can be implemented in software, in hardware, or in a combination of software and hardware.

Also, the first packet handling entity can comprise a header decompressor that receives data packets and performs header decompression thereon. Here, the second packet handling entities are radio link control (RLC) entities, wherein one of the RLC entities is an unacknowledged mode (UM) RLC entity. Alternatively, two of the RLC entities are unacknowledged mode (UM) RLC entities, a first UM RLC entity for data service in a first direction and a second UM RLC entity for data service in a second direction. Here, the UM RLC entities can be implemented in software, in hardware, or in a combination of software and hardware.

Preferably, a first UM RLC has a transmitter to transmit packet data, a second UM RLC has a receiver to receive packet data, and a third RLC entity is an acknowledged mode (AM) RLC entity. 38. Here, the AM RLC entity can be implemented in software, in hardware, or in a combination of software and hardware.

Preferably, the AM RLC has a transmitter to transmit packet data and a receiver to receive packet data. One packet sub-stream is for RTP (real-time transport protocol) packets and the other packet sub-stream is for RTCP (RTP control protocol) packets. Here, the RTP packets are forwarded to an unacknowledged mode (UM) RLC entity and the RTCP packets are forwarded to an acknowledged mode (AM) RLC entity.

The RTP packets received by the UM RLC are processed at a higher priority than the RTCP packets received by the AM RLC entity.

Preferably, the UM RLC entity outputs RTP (real-time transport protocol) packets and the AM RLC entity outputs RTCP (RTP control protocol) packets to a lower protocol layer in the same packet stream, the RTP packets being output at a higher priority than the RTCP packets. Here, logical channel multiplexing can be performed.

Here, the UM RLC entity outputs RTP (real-time transport protocol) packets and the AM RLC entity outputs RTCP (RTP control protocol) packets to a lower protocol layer in separate packet streams, the RTP packets having a higher priority than the RTCP packets. Here, transport channel multiplexing can be performed.

Preferably, the packet handling entities are for Voice over Internet Protocol (VoIP) communications, wherein the packet handling entities are part of a radio protocol of a network that allows communication between two end users. Here, the network can be a UTRAN (UMTS Terrestrial Radio Access Network), and the packet handling entities can be part of a radio protocol of an end user, such as user equipment (UE), a wireless communications device, or the like.

By advantageously applying the present invention, multimedia services having various QoS requirements can be effectively provided in the radio interface. In particular, in a service such as VoIP wherein packets for which delay time is important and packets for which error rate is important are transmitted together, the QoS that is appropriate for each type of packet can be guaranteed, and thus the present invention is helpful in improving the overall service quality.

Although various aspects, embodiments, and features of the present invention have been described for UMTS, many of these techniques can be advantageously applied for other communications systems.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but us to be accorded the widest scope consistent with the principles and novel features disclosed herein.

What is claimed is:

1. A method implemented in a computing system for processing data packets transmitted over a single radio bearer service in a mobile communication network, the method comprising:
    receiving, in a mobile communication terminal, data transmitted in a single packet stream;
    determining a characteristic of data transmitted over the single packet stream; and
    splitting contents of data packets communicated over a single stream into at least two different sub-streams according to the characteristic of each content,
    wherein contents having different characteristics are transmitted separately in each sub-stream according to a delay or error rate requirement appropriate for the respective content,
    wherein first content having a first characteristic is transmitted over a first sub-stream with a first transmission priority and second content having a second characteristic is transmitted over a second sub-stream with a second transmission priority;
    wherein the characteristic of each packet identifies a packet type,
    wherein the first sub-stream is for real-time transport protocol (RTP) packets and the second sub-stream is for real-time transport control protocol (RTCP) packets,
    wherein the RTP packets are transmitted through an unacknowledged mode (UM) RLC entity and the RTCP packets are transmitted through an acknowledged mode (AM) RLC entity, and
    wherein the first transmission priority has a higher priority compared with the second transmission priority such that the RTP packets transmitted through the UM RLC are processed at a higher priority than the RTCP packets transmitted through the AM RLC entity.

2. The method of claim 1, wherein the splitting is performed according to a quality of service requirement.

3. The method of claim 1, further comprising performing logical channel priority handling.

4. The method of claim 3, wherein the logical channel priority handling minimizes any delays in transmitting the RTP packets by transmitting the RTP packets at a higher priority compared with the RTCP packets.

5. The method of claim 1, wherein header compression is performed for the packets in the received single packet stream, prior to the splitting.

6. The method of claim 1, further comprising:
    receiving packets from two different sub-streams, wherein each sub-stream has a different delay requirement and/or an error rate requirement;

combining the received packets into a single packet stream; and sending the single packet stream to an upper protocol layer.

7. The method of claim 6, wherein header decompression is performed for the packets in the single packet stream to be sent, after the combining step.

8. The method of claim 1, wherein logical channel multiplexing or transport channel multiplexing is performed.

9. The method of claim 1, wherein the steps are for VoIP communications.

10. The method of claim 1, wherein the steps are performed by a network.

11. A radio bearer service configuration comprising:
a first packet handling entity to split a received single packet stream into at least two packet sub-streams; and
at least two second packet handling entities having respectively different modes for data transmitted over a single radio bearer service, each second packet handling entity to process each packet sub-stream split by the first packet handling entity,
wherein first content having a first characteristic is transmitted over a first sub-stream with a first transmission priority and a second content having a second characteristic is transmitted over a second sub-stream with a second transmission priority,
wherein the first sub-stream is for real-time transport protocol (RTP) packets and the second sub-stream is for real-time transport control protocol (RTCP) packets,
wherein the RTP packets are forwarded to an unacknowledged mode (UM) RLC entity and the RTCP packets are forwarded to an acknowledged mode (AM) RLC entity,
wherein the first transmission priority has a higher priority compared with the second transmission priority such that the RTP packets forwarded to the UM RLC are processed at a higher priority than the RTCP packets forwarded to the AM RLC entity.

12. The radio bearer configuration of claim 11, wherein the first packet handling entity splits the single packet stream by checking a format field of a PDU such that packets of a first type are forwarded in a first packet sub-stream and packets of a second type are forwarded in a second packet sub-stream.

13. The radio bearer configuration of claim 12, wherein checking of the format field involves checking a field in a header of the PDU.

14. The radio bearer configuration of claim 12, wherein the first type of packets are RTP packets and the second type of packets are RTCP packets.

15. The radio bearer configuration of claim 11, wherein each packet handling entity is part of a radio protocol layer.

16. The radio bearer configuration of claim 11, wherein the first packet handling entity is a PDCP entity.

17. The radio bearer configuration of claim 11, wherein the first packet handling entity comprises a header compressor that receives data packets and performs header compression thereon.

18. The radio bearer configuration of claim 17, wherein the first packet handling entity comprises a splitter that splits the single packet stream into one packet sub-stream for RTP packets and another packet sub-stream for RTCP packets.

19. The radio bearer configuration of claim 18, wherein the splitter is implemented in software, in hardware, or in a combination of software and hardware.

20. The radio bearer configuration of claim 11, wherein the first packet handling entity comprises a combiner that combines one packet sub-stream for RTP packets and another packet sub-stream for RTCP packets into a single packet stream.

21. The radio bearer configuration of claim 20, wherein the combiner is implemented in software, in hardware, or in a combination of software and hardware.

22. The radio bearer configuration of claim 20, wherein the first packet handling entity comprises a header decompressor that receives data packets and performs header decompression thereon.

23. The radio bearer configuration of claim 11, wherein the second packet handling entities are RLC entities.

24. The radio bearer configuration of claim 23, wherein one of the RLC entities is a UM RLC entity.

25. The radio bearer configuration of claim 23, wherein two of the RLC entities are UM RLC entities, a first UM RLC entity for data service in a first direction and a second UM RLC entity for data service in a second direction.

26. The radio bearer configuration of claim 25, wherein the UM RLC entities are implemented in software, in hardware, or in a combination of software and hardware.

27. The radio bearer configuration of claim 25, wherein a first UM RLC has a transmitter to transmit packet data, a second UM RLC has a receiver to receive packet data.

28. The radio bearer configuration of claim 25, wherein a third RLC entity is an AM RLC entity.

29. The radio bearer configuration of claim 28, wherein the AM RLC entity is implemented in software, in hardware, or in a combination of software and hardware.

30. The radio bearer configuration of claim 28, wherein an AM RLC has a transmitter to transmit packet data and a receiver to receive packet data.

31. The radio bearer configuration of claim 11, wherein the UM RLC entity outputs RTP packets and the AM RLC entity outputs RTCP packets to a lower protocol layer in the same packet stream, the RTP packets being output at a higher priority than the RTCP packets.

32. The radio bearer configuration of claim 31, wherein logical channel multiplexing is performed.

33. The radio bearer configuration of claim 11, wherein the UM RLC entity outputs RTP packets and the AM RLC entity outputs RTCP packets to a lower protocol layer in separate packet streams, the RTP packets having a higher priority than the RTCP packets.

34. The radio bearer configuration of claim 33, wherein transport channel multiplexing is performed.

35. The radio bearer configuration of claim 11, wherein the packet handling entities are for VoIP communications.

36. The radio bearer configuration of claim 11, wherein the packet handling entities are part of a radio protocol of a network that allows communication between two end users.

37. The radio bearer configuration of claim 36, wherein the network is a UTRAN.

38. The radio bearer configuration of claim 11, wherein the packet handling entities are part of a radio protocol of an end user.

39. The radio bearer configuration of claim 38, wherein the end user comprises user equipment.

40. The radio bearer configuration of claim 38, wherein the end user is a wireless communications device.

* * * * *